United States Patent
Kapur et al.

(10) Patent No.: US 10,992,753 B2
(45) Date of Patent: Apr. 27, 2021

(54) EDGE COMPUTING-BASED DISTRIBUTED NETWORK ARCHITECTURE THAT ENABLES PREEMPTIVE CLIENT-TARGETED LOCAL DATA STORAGE

(71) Applicant: Bank of America Corporation, Charlotte, NC (US)

(72) Inventors: Monika Kapur, Jacksonville, FL (US); Sean Denton, Rock Hill, SC (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/433,028

(22) Filed: Jun. 6, 2019

(65) Prior Publication Data

US 2020/0389524 A1    Dec. 10, 2020

(51) Int. Cl.
*H04L 29/08* (2006.01)
*G01W 1/02* (2006.01)
*G08B 21/10* (2006.01)

(52) U.S. Cl.
CPC ............ *H04L 67/12* (2013.01); *G01W 1/02* (2013.01); *G08B 21/10* (2013.01); *H04L 67/18* (2013.01); *H04L 67/10* (2013.01)

(58) Field of Classification Search
CPC ......... H04L 67/12; H04L 67/18; H04L 67/10; G01W 1/02; G08B 21/10
See application file for complete search history.

(56) References Cited

U.S. PATENT DOCUMENTS

| 8,243,596 B2 * | 8/2012 | Fedders .............. H04L 67/2842 370/230 |
| 8,244,874 B1 | 8/2012 | Thireault |

(Continued)

OTHER PUBLICATIONS

Mary Shacklett, "Edge Computing: A Cheat Sheet,"hitps://www.techrepublic.com/article/edge-a')mputins-the-smarc-persons-swide/. Jul. 21, 2017 (Year: 2017).*

(Continued)

*Primary Examiner* — Michael C Lai
(74) *Attorney, Agent, or Firm* — Weiss & Arons LLP; Michael A. Springs, Esq.

(57) ABSTRACT

The disclosure relates to an edge computing-based distributed network architecture. A central server in the architecture may include a client-location monitoring module for tracking a principle location of a client, which may be co-located with a remote hub institution. The central server may also include a client information packaging module, for packaging information associated with the client into a digital package; a natural-disaster monitor module, for monitoring for future natural-disasters; and a transmission module for transmitting a packaging instruction from the natural-disaster monitor module to the client information packaging module when the natural-disaster monitor module communicates that a natural-disaster is predicted to occur within a certain threshold distance and within a certain threshold amount of time. The transmission module may also retrieve, following packaging, the package from the client information packaging module and transmit the digital package to the remote hub institution for secure, albeit typically temporary, storage thereat.

8 Claims, 8 Drawing Sheets

(56) References Cited

U.S. PATENT DOCUMENTS

| | | |
|---|---|---|
| 9,900,725 B2 | 2/2018 | Young et al. |
| 2003/0195941 A1* | 10/2003 | Amiri ................... H04L 69/329 |
| | | 709/214 |
| 2003/0208510 A1* | 11/2003 | Doyle ................. G06F 16/9574 |
| 2009/0083422 A1* | 3/2009 | McKay ............... H04L 63/0272 |
| | | 709/225 |
| 2014/0207721 A1* | 7/2014 | Filson ................ G05D 23/1902 |
| | | 706/46 |
| 2018/0121891 A1 | 5/2018 | Hosny et al. |
| 2018/0167445 A1 | 6/2018 | Speight et al. |
| 2018/0367314 A1 | 12/2018 | Egner et al. |
| 2019/0026450 A1 | 1/2019 | Egner et al. |

OTHER PUBLICATIONS

Mary Shacklett, "Edge Computing: A Cheat Sheet," https://www.techrepublic.com/article/edge-computing-the-smart-persons-guide/, Jul. 21, 2017.

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

* cited by examiner

EDGE COMPUTING-BASED DISTRIBUTED NETWORK ARCHITECTURE THAT ENABLES PREEMPTIVE CLIENT-TARGETED LOCAL DATA STORAGE

FIELD OF TECHNOLOGY

Aspects of the disclosure relate to a distributed network architecture. Specifically, the disclosure relates to leveraging edge computing in context of the network architecture. For the purposes of this application edge computing may be understood to refer to computers for running applications that sit close to the edge of the network where the digital world meets the real world. As such, the edge computers referred to in this application typically sit at remote hub institutions associated with the network as opposed to at the central server.

BACKGROUND OF THE DISCLOSURE

Various entities use distributed architectures. Such architectures typically include a central server and remote hubs.

Oftentimes, the bulk, if not all, of the information and transactional processing in the architectures resides at the central server. Accordingly, the central servers bear the great majority of the network resource consumption.

Such resource consumption may often tax the central server while leaving the edges underused—in terms of resource consumption. Moreover, concentration of information storage and transaction processing at the central server typically leaves the remote hubs vulnerable to being separated from the central server. Such separation from the central server can reduce, or even shut down, transaction processing at the remote hubs. Such separation can be caused by a communications breakdown between the central server and the remote hubs. Such separation can be caused by a weather-related disaster. Such separation can be voluntarily—for example when the architecture self-terminates the communications between the central server and the remote hub in response to a security breach.

It would be desirable to leverage the end points of such an architecture to divert transaction processing and information storage, at least temporarily, from the central server.

It would be further desirable to process transactions and store information exclusively at the end points for periods of time in order conserve resources at the central server.

It would be even more desirable to monitor for possible communication interruption events and then, in response thereto, package client information into a digital package, and transfer the digital package to the remote hub prior to the predicted interruption.

SUMMARY OF THE DISCLOSURE

A method for enabling local data storage in a network is provided. The network may include a central server and a plurality of remote hub institutions. The method may include tracking and storing a principle location of a client. The principle location of the client may be co-located, i.e., in relatively close proximity, with at least one of the plurality of remote hub institutions.

The method may further include monitoring for certain occurrences such as for future natural-disasters or other events that would require or perhaps cause an interruption of the communications between the central server and a remote hub institution. The method may also include transmitting a transmission instruction to the central server when a natural-disaster or other interruption is predicted to occur within a certain threshold distance of the remote hub institution and within a certain threshold amount of time in the future.

In response to receiving the transmission instruction, the method may include packaging the digital package at, and transmitting the digital package from, the central server. The method may further include transmitting the digital package to the remote hub institution for secure storage thereat, preferably for the duration of the natural disaster or other occurrence.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

An edge computing-based distributed network architecture that enables local data storage is provided. Such an architecture may include a central server. The central server may include a client-location monitoring module.

The client-location monitoring module may be configured for tracking a principle location of a client. The principle location of the client may, in some embodiments, be co-located with a remote hub institution.

The central server may include a client information packaging module for responsively packaging, upon receipt of a transmission instruction, a current reckoning of information associated with the client into a digital package for transmission. Such a reckoning may include all of the relevant client records. Transmission of such a reckoning to the remote hub may preferably change, at least temporarily, the system of record for the client, from the central server to the remote hub.

In some embodiments, the central server may also include a natural-disaster monitor module. The natural-disaster monitor module may monitor for the possibility of future natural-disasters.

The central server may also include a transmission module in electronic communication with the natural-disaster monitor module and the client information packaging module. The transmission module may transmit the transmission instruction from the natural-disaster monitor module to the client information packaging module when the natural-disaster monitor module communicates to the transmission module that a natural-disaster is predicted to occur within a certain threshold distance of the remote hub institution and within a certain threshold amount of time in the future.

In response to receiving the transmission instruction, the client information packaging module may package, and the central server may then transmit, the digital package to the remote hub institution for secure storage thereat.

One advantage to the present system is that the system may increase flexibility vis-à-vis the client account and relationship. For example, the system may elect to periodically send packages of a client's information to the hub institution for use and short-term administration thereat. In such systems, the secure storage of client information at the hub may enable efficient and timely administration of the client's account even absent continually updated communications with the central server.

The natural-disaster monitor module may further include a plurality of environmental sensors for receiving natural disaster and/or weather event indications. Information derived from these sensors may be coupled with information derived from a live feed from a third party information source. Information derived from the sensors, together with live feed from a third party information source, may be used in a complementary fashion to trigger transmitting of the transmission instruction from the natural-disaster monitor module.

Sensors may include devices that detect changes in a physical or virtual environment. For example, sensors may measure audio, rainfall, temperature or water levels.

Sensors may be any suitable size. For example, sensors may be a few millimeters in size. Sensors may be deployed in a wide variety of locations. Sensors may "sense" two or more stimuli or environmental changes.

Captured data may be transmitted using any suitable transmission method. For example, data captured by a sensor may be extracted by a mobile phone. Sensors may leverage a communication link provided by a mobile phone to communicate captured data to another node.

Captured data may be transmitted by the sensor and processed away from the location of the sensor that captured the data. For example, captured data may be transmitted from one node to another node until the captured data reaches a data repository.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. In some embodiments, the captured data may be organized by the data repository.

In some embodiments, sensor data may be transmitted continuously. In some embodiments, sensor data may be transmitted on a periodic schedule. In some embodiments, sensor data may be transmitted in response to a change in conditions detected by the sensor.

The client-location monitoring module may be further equipped with sensors for tracking a plurality of real-time biometrics of the client. The client-location monitoring module may also be configured to analyze the plurality of real-time biometrics in order to produce a real-time, individual-client-directed analysis. Based on the analysis, the client-location monitoring module, or other suitable analysis system, may generate and display one or more client recommendations based on the analysis. Such recommendations may include product recommendations. Such product recommendations may be informed by the real-time biometrics tracked by the sensors. For example, the bio-metrics, together with the weather information, may reveal the client is under a high stress level, possibly as a result of a natural disaster. In such a case, the system may recommend a loan product to the client to help the client get through the high-stress period.

Such analysis may include comparing the currently-retrieved bio-metric information with historic bio-metric information and/or historic informative patterns derived from the historical interactions with the client. Furthermore, such historic bio-metric information and/or historic informative patterns may be leveraged, together with the current bio-metric client information, to provide relevant recommendations to the client.

In certain embodiments, receipt, at the central server or the hub, of a change of an internet protocol (IP) address associated with the client may cause the server to update the principle location of a client, or at least to perform additional research regarding the location of the client. Based at least in part on the updating, the client-location monitoring module may be configured to determine an updated remote hub institution.

In some embodiments, in response to a loss of internet connection between the central server and the remote hub institution, the transmission module may be configured to transmit an emergency transmission instruction from the natural-disaster monitor module or other relevant module to the client information packaging module. An emergency transmission instruction may indicate that an immediate package be generated and transmitted from the central server to the remote hub.

In some embodiments, the client information packaging module may be configured to periodically exchange information between a plurality of sensors located at the remote hub institution and the central server.

Specifics of an edge computing-based distributed network architecture that enables preemptive client-targeted local data storage according to certain embodiments follow. The embodiments are described in conjunction with FIGS. 1-8.

Figure 1:
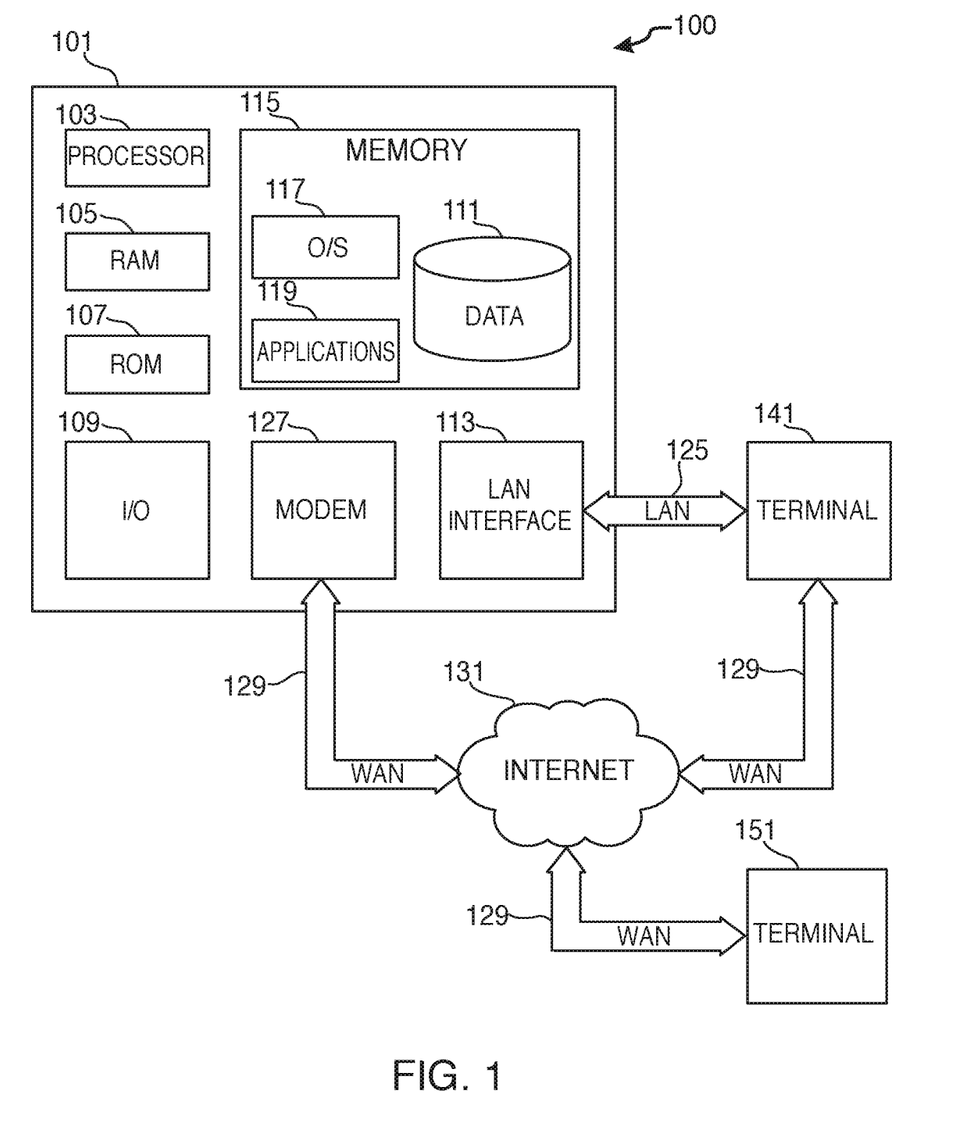
FIG. 1 shows an illustrative block diagram of a system that includes a computer.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transmitting, tracking, authorizing, and/or controlling natural disaster monitoring, client location monitoring, file packaging, file transmission, etc. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to transmitting, tracking, authorizing, and/or controlling natural disaster monitoring, client location monitoring, file packaging, file transmission, etc.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
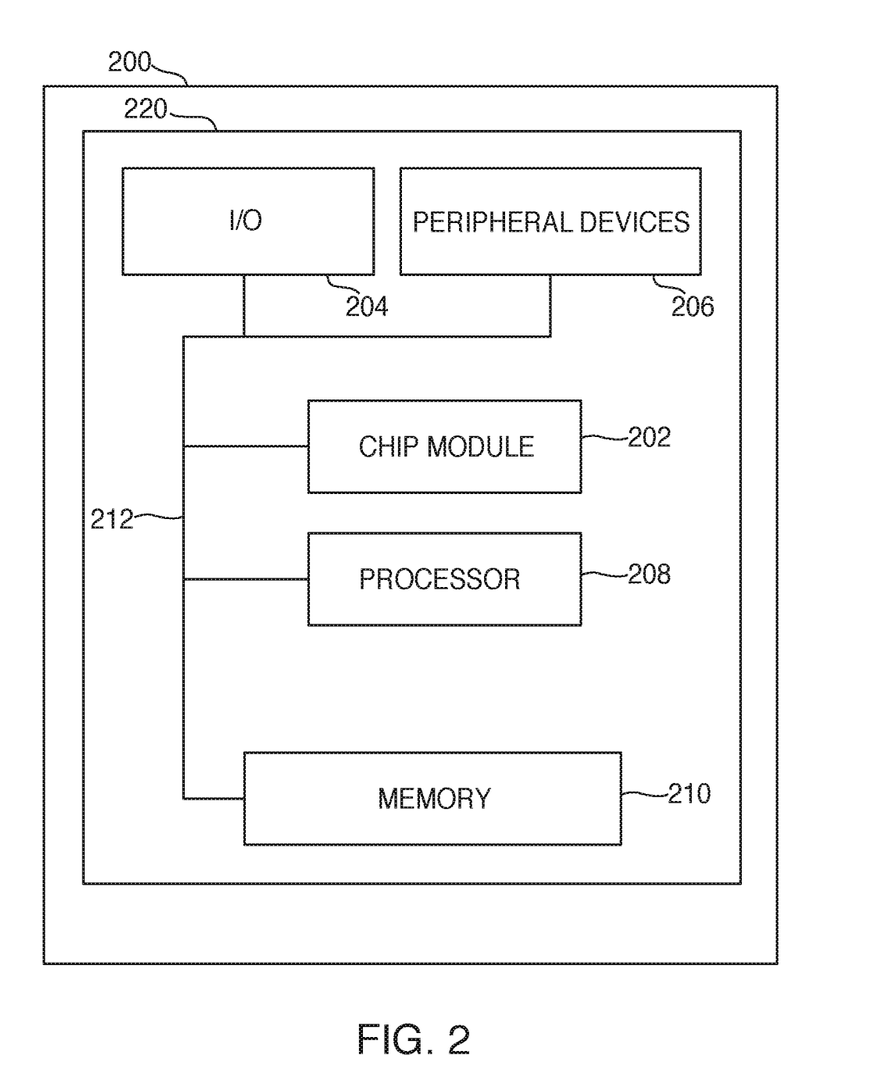
FIG. 2 shows an illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
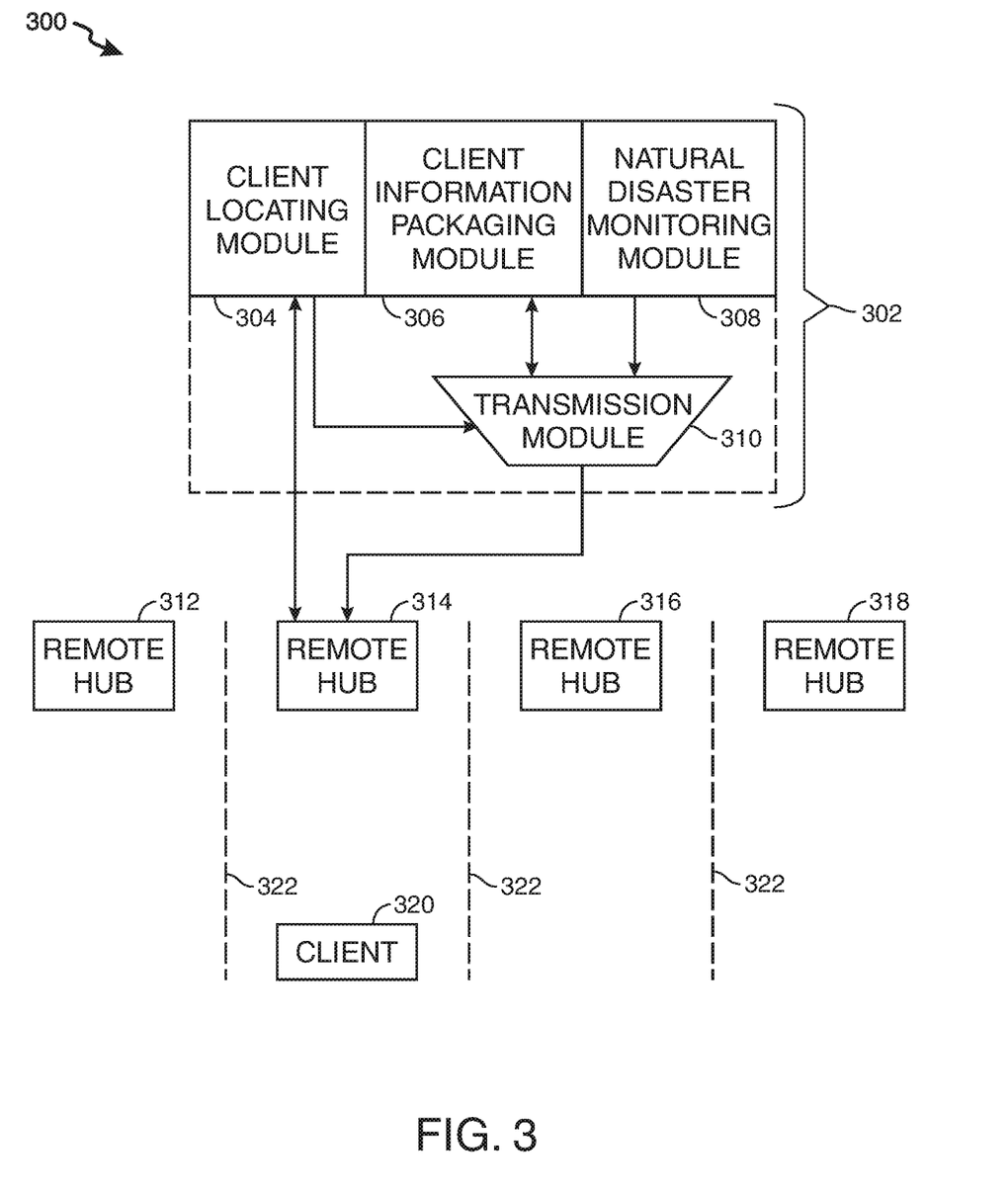
FIG. 3 shows an architecture according to aspects of the disclosure.

FIG. 3 shows an architecture 300 according to aspects of the disclosure. Architecture 300 includes a central server 302. Central server 302 may include client locating module 304, client information packaging module 306, natural disaster monitoring module 308 and transmission module 310.

Client-location monitoring module 304 may track a principle location of a client 320. Such a principle location may include the residence of a client 320. Such a principle location may include the workplace of client 320. In fact, such a principle location of a client 320 may include any suitable location at which client 320 spends the majority or a significant minority of his or her time. Demarcation lines 322 indicate a physical separation, and a distance between, remote hubs 312-318.

The principle location of client 320 is preferably co-located with one or more predetermined remote hub institutions 312-318. One of the remote hub institutions 312-318 may, in some embodiments, be where client 320 performs most of his or her in-person banking.

The client information packaging module 306 may be configured to responsively package a current reckoning of information associated with client 320 into a digital package for transmission. The digital package may be transmitted, upon receipt of a transmission instruction, from the central server 302 to the remote hub institution 314 co-located with the principle location of client 320. Such a transmission may ensure that the client's information is proximal to client 320 in the event of a natural disaster or other occurrence that potentially severs communications between central server 302 and remote hub institution 314.

Natural-disaster monitor module 308 monitors for future and/or impending natural-disasters. This monitoring may be implemented through a live feed from a third-party data source such as a satellite weather data source (see, e.g., FIG. 5, element 525, FIG. 6, element 625). In certain embodiments, this monitoring may be implemented through live environmental sensors located at the remote hub (see, e.g., FIG. 4, element 424.) In some embodiments, the monitoring may be implemented through a feed from proximal environmental sensors and from third-party data sources (see, e.g., FIG. 6, elements 624 and 626).

In certain embodiments, such as some select embodiments in which the monitoring is implemented at least through live environmental sensors located at the remote hub, a packaging and transmission of client information for storage at the remote hub may be limited to those circumstances where the live environmental sensors confirm, through on-site environmental condition detection, the initial stages of an occurrence of a natural disaster, or of an impending natural disaster. In these circumstances, the packaging and transmission, which may be bandwidth- and memory-intensive operations, may be avoided until the latest-in-time, or proximal to the latest-in-time, moment, thereby conserving expenditure of bandwidth and memory resources until absolutely necessary to transmit the client's information to a location proximal to the client.

Other advantages associated with the embodiments set forth herein may be transferring the bulk of the real-time data analysis and application performance to the edge, performed by sensors, and other devices, located at the remote hub institution, from the central server. This will allow the scheduling of downtime at the server because much, if not all, of the client's interactions can be handled for extended periods at the remote hub institution. As edge computing develops further, the edge computing can be further leveraged to improve the distributed network structure by deflecting a growing amount of central server processing to the edge.

Central server 300 may also include a transmission module 310. The transmission module 310 may be in electronic communication with natural-disaster monitor module 308 and client information packaging module 306. In certain embodiments, transmission module 310 may also receive transmission instructions, such as identification of a remote hub institution to which the package should be transmitted, from client locating module 304.

Client information packaging module 306 may be configured to, in response to information from natural-disaster monitor module 308 that a natural-disaster is predicted to occur within a certain threshold distance of the remote hub institution and/or within a certain threshold amount of time in the future, generate a digital package of the client information for transmission to a pre-determined remote hub 314.

Transmission module 310 may be configured to, in response to information from natural-disaster monitor module 308 that a natural-disaster is predicted to occur within a certain threshold distance of the remote hub institution and/or within a certain threshold amount of time in the future, transmit the recently-generated package from the client information packaging module 306 to a pre-determined remote hub 314. In such a circumstance, the client information packaging module 306 may package, and transmission module 310 may transmit, the digital package to the remote hub institution for secure storage thereat.

Figure 4:
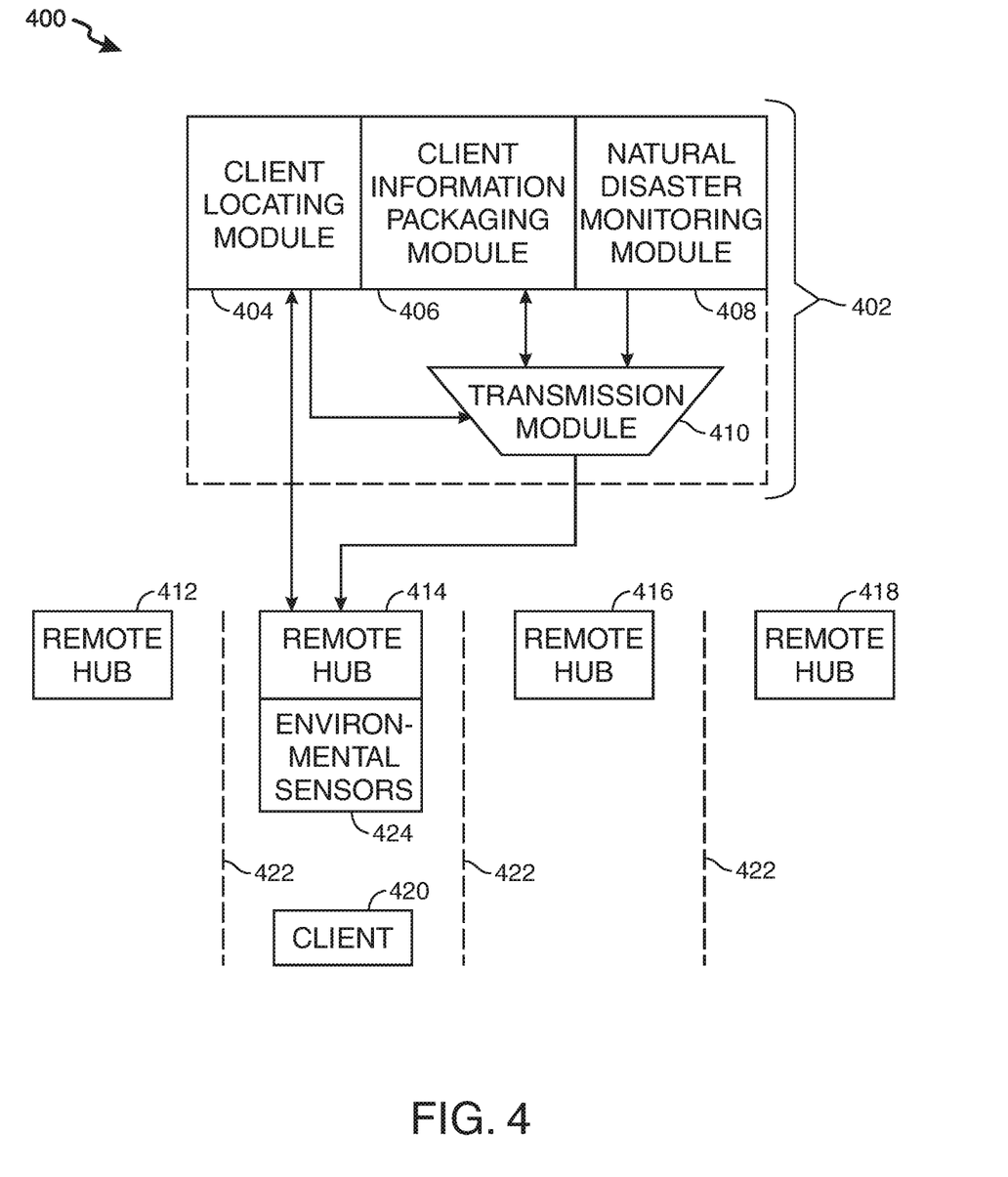
FIG. 4 shows, in addition to the identical architecture displayed in FIG. 3, environmental sensors.

FIG. 4 shows, in addition to the identical architecture displayed in FIG. 3, environmental sensors 424. Environmental sensors 424 may, in certain embodiments, be used to locally confirm weather information, natural disaster information, or any other relevant information. Environmental sensors 424 may further be configured to communicate such information, preferably in real-time as described above in more detail, to any suitable location such as, for example, remote hub 414, central server 402 and/or any other identified and accessible location.

Figure 5:
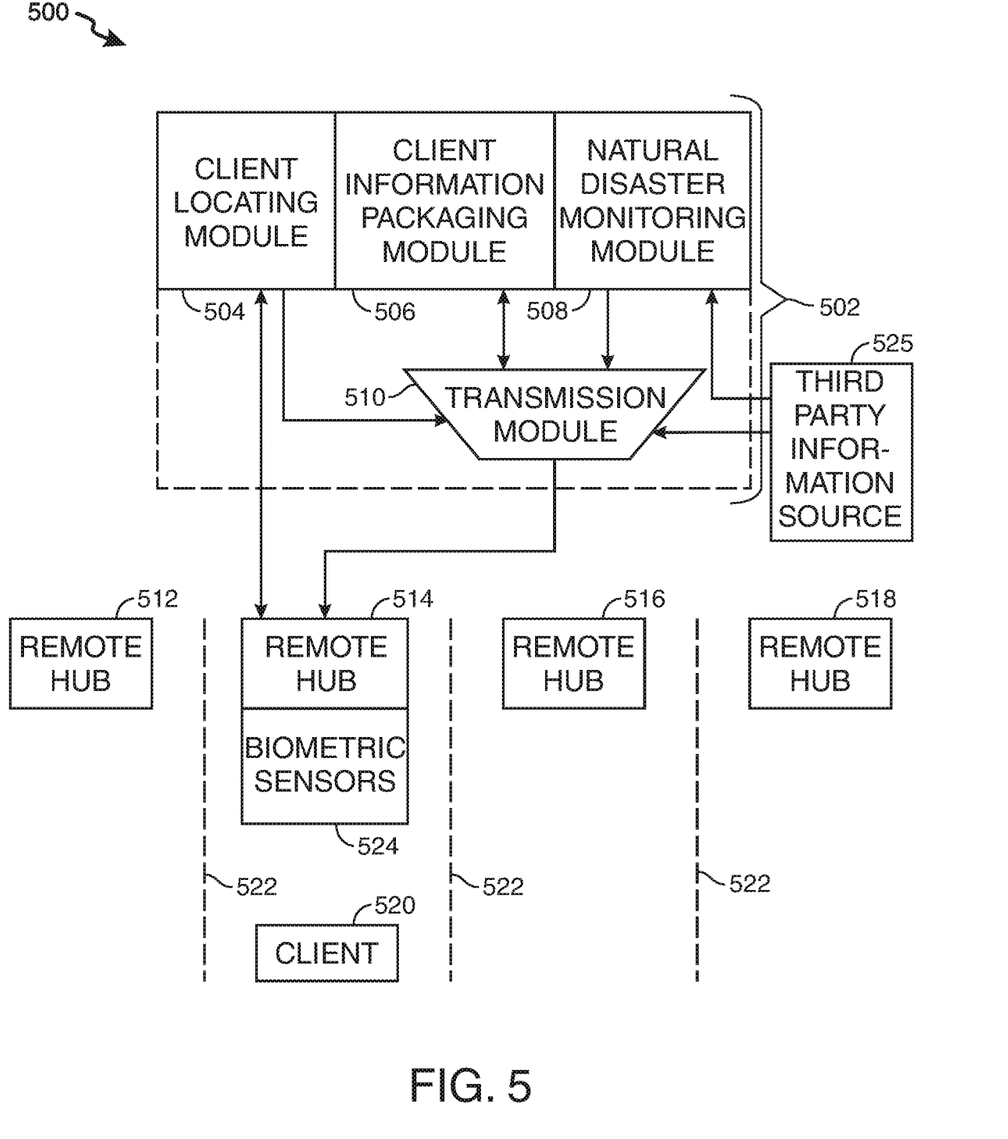
FIG. 5 shows, in additional to the identical architecture displayed in FIGS. 3 and 4, biometric sensors and third party information source.

FIG. 5 shows, in additional to the identical architecture displayed in FIGS. 3 and 4, biometric sensors 524 and third party information source 525. Biometric sensors 524 may, in certain embodiments, be used to locally confirm biometric information about a client 520. Such information may be useful in recommending one or more courses of action to the client. Such information may also be useful in interacting with the client.

Third party information source 525 may provide information regarding the weather, natural disaster or any other suitable information needed by remote hub 514 and/or central server 502. Such information may, in the case of weather information retrieval for example, be used to confirm information retrieved by live environmental sensors 424 shown in FIG. 4, and/or alert regarding same.

Figure 6:
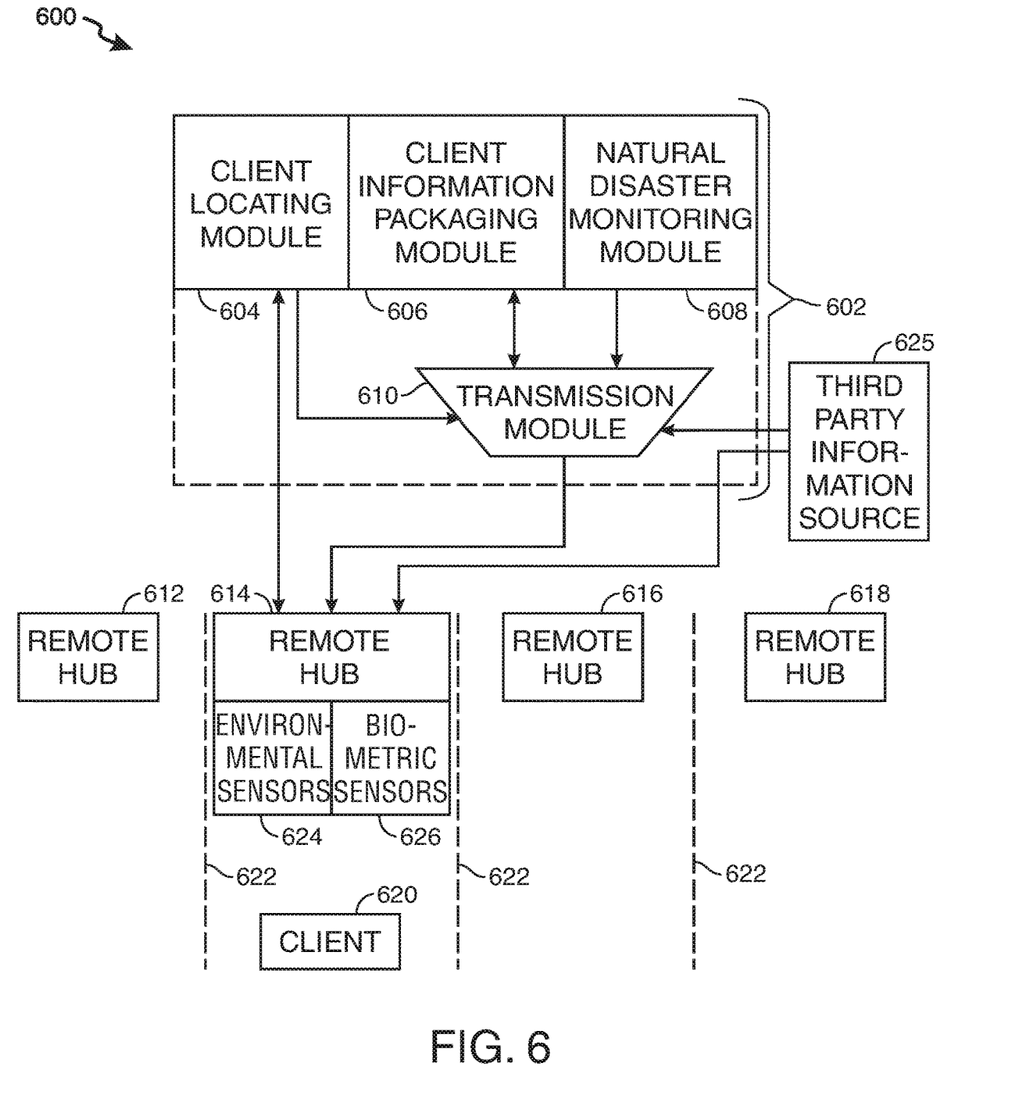
FIG. 6 shows another embodiment of an architecture according to the disclosure.

FIG. 6 shows another embodiment of an architecture 600 according to the disclosure. This architecture preferably combines all sensors 624-626 into a single architecture. It should be noted that all, some or even one of the sensors may preferably provide information in real-time. Each of sensors 624-626 may provide corroborative information to one another, or to the central server, regarding the information retrieved from a second sensor. For example, if a natural weather-based disaster is imminent, this may show up in all three sensors—i.e., 1) environmental sensors because of changes to the immediate physical environment of the remote hub institution 2) bio-metric sensors because of stress and/or physical changes to the client caused by the natural weather-based disaster and 3) third-party data sources which will report the imminent natural weather-based disaster. As such, the reliability of the information derived from each of the sensors can preferably improve based on cross-checking with the information derived from the other sensors and/or other information sources.

It should be noted that, while examples in this application describe sensors retrieving weather-based information, other events which might compel transmission and storage of client information at a remote hub institution are within the scope of this application. As such, the sensors may derive any relevant information from environmental sensors, bio-metric sensors, other suitable sensors and/or third-party data sources that relates to the current client situation.

Figure 7:
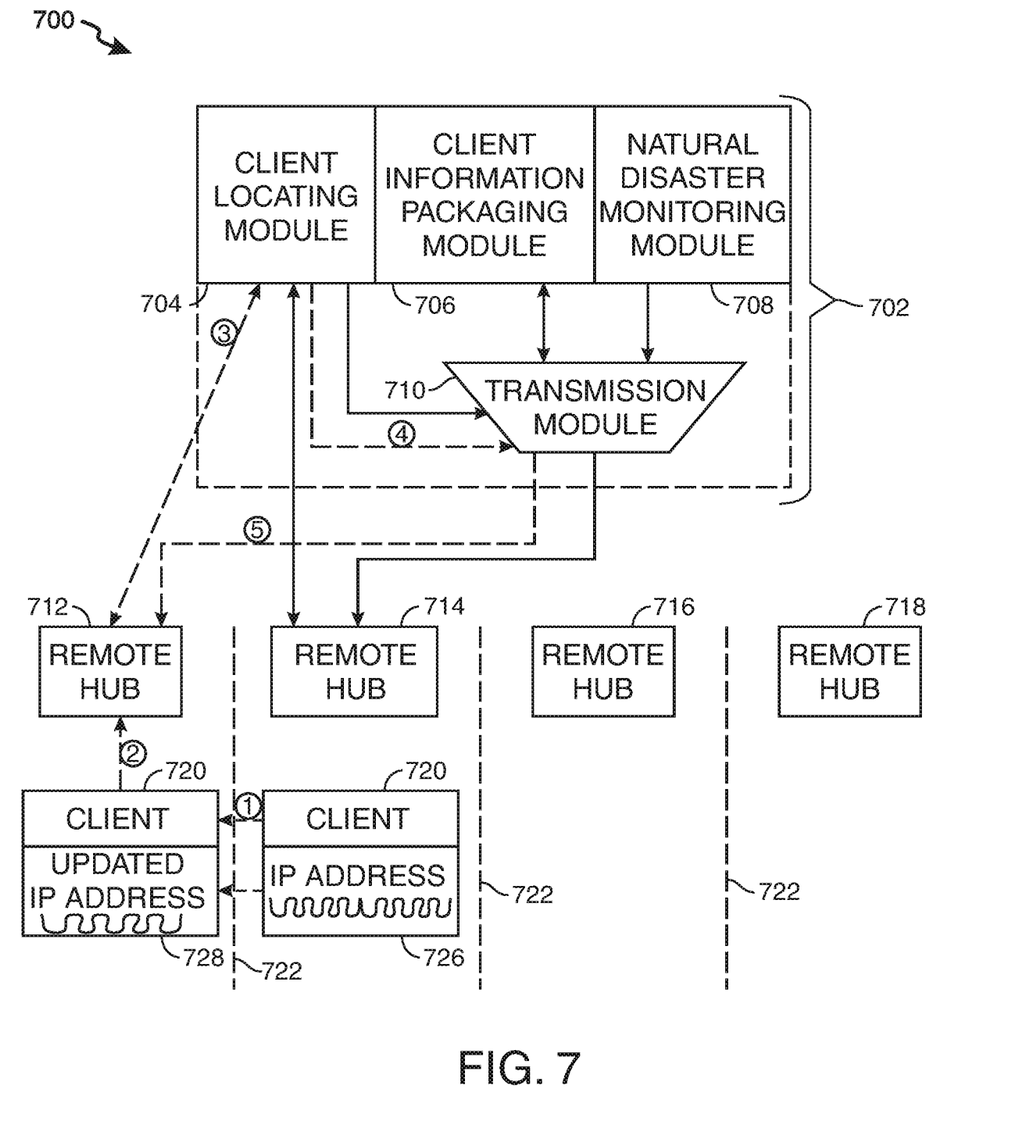
FIG. 7 shows yet another embodiment of an architecture according to the disclosure.

FIG. 7 shows yet another embodiment of an architecture 700 according to the disclosure. In architecture 700, which is similar to the architecture shown in the preceding FIGURES, a change of a client's principle IP address is shown. Specifically, the client is shown, at step 1, as changing his principle IP address from 726 to 728, which may also signal a change of client 720's physical address. In addition, the client's physical interactions and/or physical location, as shown at step 2, may have also changed from remote hub 714 to remote hub 712. At step 3, remote hub institution 712 is shown as having updated, regarding the client change of position, client locating module 704. Client locating module 704 may then inform transmission module 710 of the client's new location, both physically and in cyber-space. Thereafter, if transmission module 710 is to receive a digital package involving client 720 from client information packaging module 706 and/or predictive natural disaster information from natural disaster monitoring module 708, the digital package will preferably be transmitted to remote hub institution 712 as opposed to remote hub institution 714.

Figure 8:
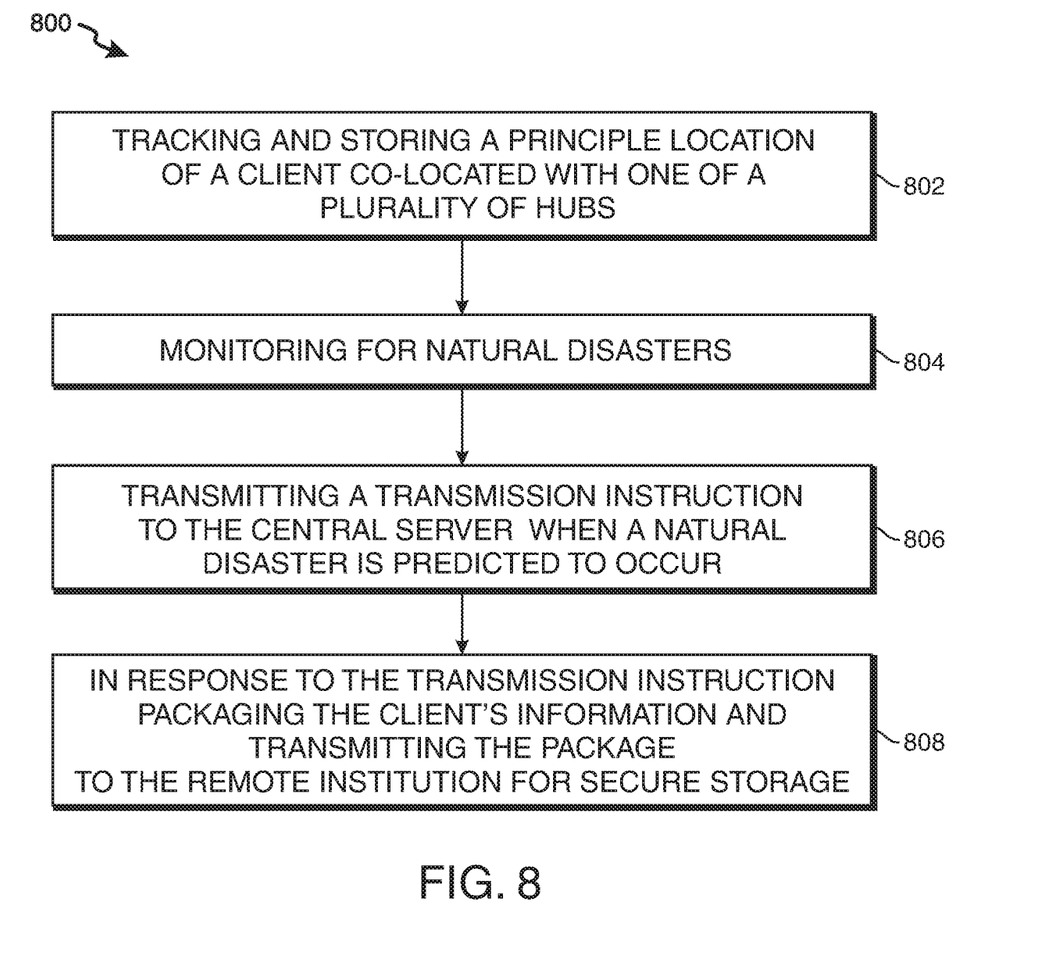
FIG. 8 shows an illustrative flow diagram that specifies a process associated with an embodiment of a method according to the disclosure.

FIG. 8 shows an illustrative flow diagram that specifies a process 800 associated with an embodiment of a method according to the disclosure.

Step 802 shows tracking and storing a principle location of a client—co-located with one of a plurality of remote hub institutions. Step 804 shows monitoring for natural disasters or other such events. The reason for monitoring for the occurrence of such events is that, in anticipation of such an event, the system may be configured to package the client information into a digital package for storing at the remote hub location closest, and, therefore, the most physically accessible, to the physical location of the client or, alternatively, to the remote hub location most relevant to the client.

Step 806 shows transmitting a transmission instruction to the central server (which may also be generated within the various modules of the central server, as set forth herein) when a natural disaster or other relevant event is predicted to occur. As described above, such an event may initiate a packaging in a digital package, and transmission of such package, of all relevant client information such that, at least for the duration of the event, the client information is stored and preferably fully accessible and mutable, as needed, at the remote hub institution.

Step 808 shows, in response to receiving the transmission instruction at the central server, packaging the client's information and transmitting the package to the remote institution for secure storage.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for providing an edge computing-based distributed network architecture that enables client-targeted preemptive local data storage are disclosed. Persons skilled in the art will appreciate that the present invention can be practiced by other than the described embodiments, which are presented for purposes of illustration rather than of limitation, and that the present invention is limited only by the claims that follow.

What is claimed is:

1. A method for enabling local data storage in a network, said network comprising a central server and a plurality of remote communications hubs, said method comprising:
   tracking and storing a principle location of a client, said principle location of the client being co-located with at least one of the plurality of remote communications hubs;
   monitoring for future natural-disasters; and transmitting a packaging instruction to said central server when a natural-disaster is predicted to occur within a certain threshold distance of the at least one remote communication huh and within a certain threshold amount of time in the future; and in response to receiving the packaging instruction, packaging at; and transmitting from, the central server a digital package, said digital package comprising a complete record of the client's information, to the at least one remote communication hub for secure storage;

wherein said transmitting further comprises changing a system of record, said system of record that provides the location of storage of the complete record of the clients information, at least temporarily, from the central server to the at least one remote communication hub.

2. The method of claim 1 further comprising utilizing a plurality of environmental sensors, said sensors located proximal to said at least one remote communication hub, for receiving a plurality of natural disaster and/or weather event indications the receipt of which, coupled with information derived from a live feed from a third party information source, are sufficient to trigger the transmission instruction.

3. The method of claim 1, wherein the at least one of the plurality of remote communications hubs comprises a client-location monitoring module, and the client-location monitoring module is further equipped with sensors for tracking a plurality of real-time biometrics of the client.

4. The method of claim 3, further comprising analyzing the plurality of real-time biometrics in order to produce a real-time, individual-client-directed analysis, and generate and display one or more client recommendations based on said analysis.

5. The method of claim 1, further comprising, in response to receipt of a change of an internet protocol address associated with the client, updating the principle location of a client.

6. The method of claim 5, further comprising, determining, based at least in part on the updating, an updated at least one remote communication hub.

7. The method of claim 1, further comprising, in response to a loss of internet connection between the central server and the at least one remote communication hub, transmitting an emergency transmission instruction from said central server to said at least one remote communication hub.

8. The method of claim 1, further comprising periodically exchanging information between a plurality of sensors located at the at least one remote communication hub and the central server.

* * * * *